Feb. 7, 1961

A. WIKSTROM 2,970,479

WIDE RANGE ACCELEROMETER

Filed Feb. 25, 1958

ARNE WIKSTROM
*INVENTOR.*

BY *Alden O. Redfield*
*Warren Kinz*
ATTORNEYS

Feb. 7, 1961 A. WIKSTROM 2,970,479
WIDE RANGE ACCELEROMETER
Filed Feb. 25, 1958
3 Sheets-Sheet 3

ARNE WIKSTROM
INVENTOR.

BY
ATTORNEYS

United States Patent Office 2,970,479
Patented Feb. 7, 1961

2,970,479

WIDE RANGE ACCELEROMETER

Arne Wikstrom, North Scituate, R.I., assignor to AVCO Manufacturing Corporation, Cincinnati, Ohio, a corporation of Delaware Filed Feb. 25, 1958, Ser. No. 717,513

16 Claims. (Cl. 73—514)

This invention concerns an improved accelerometer and more particularly an accelerometer which operates satisfactorily over a wide range of acceleration with a graduated sensitivity of response.

Accelerometers have markedly increased in importance with the advent of the missile age. Although accelerometers have long been known and used for a variety of purposes, it wasn't until the recent emphasis on intercontinental ballistic missiles and space satellites that the need for accelerometers of improved performance characteristics became acute.

Conventional accelerometers can be built to operate over a given limited range of acceleration with great sensitivity. Problems quickly arise, however, when an attempt is made to use a single accelerometer for operation over a wide range of acceleration. If the instrument is made sufficiently sensitive to perceive small changes of acceleration, it is normally too delicate to use over a wide range of acceleration. As a result it is commonplace to use a plurality of accelerometers to cover a wide range of operating conditions. When this approach is used, it is necessary to render each of the individual accelerometers inoperative as it reaches the end of its normal operating range. Obviously, this is a more complicated arrangement than measuring acceleration over the entire range with a single instrument. The possibility of error is also obviously increased.

It is also quite difficult with conventional accelerometers to vary the sensitivity of their response at different portions of the operating ranges for which they are designed.

It is an object of the present invention to provide an improved accelerometer, particularly one which may be used over a wide range of acceleration conditions.

More particularly, it is an object to provide an accelerometer which has different degrees of sensitivity at different portions of its operating range. Thus, in one portion of its range, it may be made extremely sensitive for measuring small changes of acceleration and, in another portion of its range, much less sensitive for measuring larger values of acceleration.

A further object is the provision of a wire type accelerometer in which independent acceleration responsive effects vary the natural frequency of the wire.

It is a specific object of the invention to provide a wire type accelerometer in which both the length and tension of a taut wire may be separately varied in response to acceleration.

A further object of the invention is the provision of a wide range accelerometer which is simple in construction and employs well-known scientific principles.

Another object of the invention is the provision of an accelerometer that can be used to detect both positive and negative linear accelerations along a given axis.

Briefly, the present invention comprises an improved form of taut wire type instrument. Although the invention may have many structural forms, the preferred embodiment comprises a piece of taut ferromagnetic wire which is excited to vibrate at its natural frequency. The wire is stretched between a fixed point and a spring-supported inertial mass. Another inertial mass surrounds the wire at an intermediate point in sufficiently close clearance relationship to force a node in the wire. When the instrument is subjected to an acceleration having a component parallel to the wire, shift of position of the inertial masses relative to the fixed end of the wire occurs, and the natural frequency of the wire changes in an amount indicative of the acceleration to which the instrument has been subjected. The masses may be arranged to move at different rates under a given acceleration.

The novel features that I consider characteristic of my invention are set forth in the appended claims. The invention itself, however, both as to its organization and method of operation, together with additional objects and advantages thereof, will best be understood from the following description of specific embodiments when read in conjunction with the accompanying drawings, in which:

In conventional wire type accelerometers a taut wire is stretched between spaced members, one or both of which may be movable in response to acceleration. Relative movement of the masses changes the tension, and hence the natural frequency of vibration, of the wire. By detecting the change in frequency, the magnitude of the acceleration can be determined. An accelerometer of this general type is illustrated in the Allan Patent 2,725,492, which issued on November 29, 1955.

Figure 1:
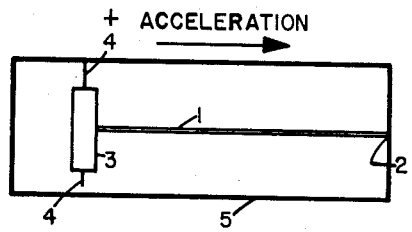
Figure 1 is a simple schematic representation of a taut wire accelerometer in which the tension of the wire is varied in response to the acceleration being detected.

A simplified schematic of such an accelerometer in which acceleration is detected by change in wire tension is shown in Figure 1. The wire is indicated at 1 stretched between a fixed point 2 and a movable inertial mass 3. The mass is supported by springs 4 which extend to a rigid outer casing 5. The casing may be secured to any device subjected to accelerations the value of which are to be measured. Thus, it will be noted that, as the casing of the accelerometer is accelerated, the inertial mass, in lagging the movements of the casing, varies the tension of wire 1 proportional to the acceleration.

Figure 2:
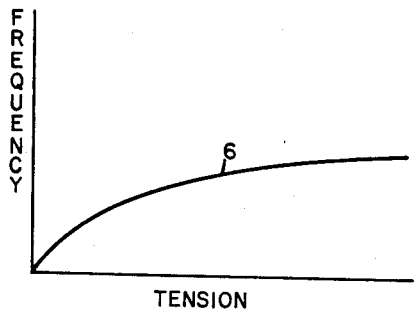
Figure 2 is a graphical representation of the natural frequency of the wire shown in the accelerometer of Figure 1 as a function of its tension.
Figure 3:
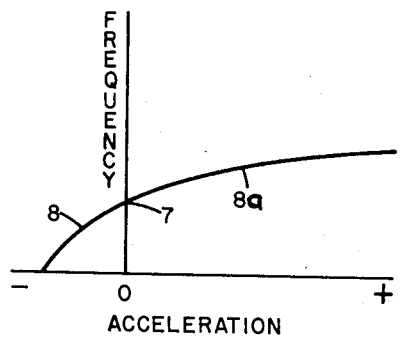
Figure 3 is a plot of the natural frequency of the wire vs. acceleration for an instrument of the type shown in Figure 1.

The effect is illustrated by Figure 2 where the natural frequency of the wire is plotted as a function of its tension. It will be noted that curve 6 first increases rather steeply as the tension is increased and then increases at a lower rate. Since it is desirable to use such an accelerometer for detecting accelerations in either a positive or a negative direction (note positive direction of acceleration as indicated in Figure 1) the wire 1 normally has an initial tension. Hence the wire, even at zero acceleration, has a finite natural frequency which is indicated in Figure 3 by point 7. If the accelerometer is accelerated in a positive direction, the frequency of the wire increases rather slowly; however, if the accelerometer is subjected to negative accelerations the frequency of the wire falls rather rapidly as indicated by the portion of the curve at 8 in Figure 3.

Figure 4:
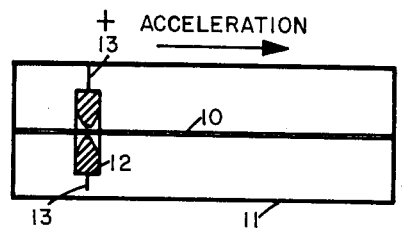
Figure 4 is a schematic representation of a simplified form of taut wire accelerometer in which the vibratory length of wire is varied in proportion to the acceleration to which the accelerometer is subjected.

A wire type accelerometer which is not conventional may now be considered with reference to Figure 4. As illustrated, a wire 10, under constant tension, is stretched between the fixed ends of a rigid casing 11. Intermediate the ends of the wire it is surrounded by an inertial disc 12 which is supported by springs 13 which are fixed to the casing 11. The inertial mass closely surrounds but does not bind wire 10. The close clearance relationship is such that a node is forced in the vibrating wire at the point where it is closest to the inertial disc 12. Friction between disc and wire, however, is negligible.

Figure 5:
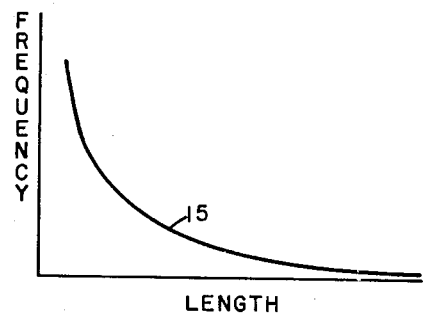
Figure 5 is a graphical representation of the variation in frequency of the wire as a function of its length.

In Figure 5 curve 15 illustrates the change of natural frequency of the wire 10 with change of length caused by movement of disc 12. In interpreting Figure 5 it may be assumed that the portion of the wire 10 extending between the right hand end of the accelerometer and the median plane of the inertial disc is artificially excited to vibrate at its natural frequency. Of course, the portion of the wire to the left of the inertial disc could also be excited into vibration and used as an acceleration indicator. However, it is more convenient to use the longer right portion of the wire to which attention is confined.

Figure 6:
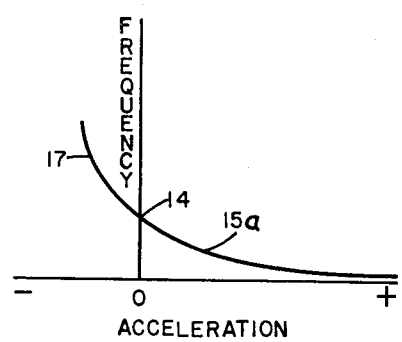
Figure 6 is a plot of the natural frequency of the wire vs. the acceleration to which the accelerometer is subjected.

Since the wire is under constant tension, it has a natural frequency, even at zero acceleration, as indicated by point 14 of curve 15a shown in Figure 6. If the accelerometer of Figure 4 is subjected to positive accelerations as indicated, the length of the vibrating portion of the wire is increased and its natural frequency at constant tensions drops as indicated by Figures 5 and 6. On the other hand, as the accelerometer is subjected to negative accelerations, the frequency rises steeply as indicated by portion 17 of curve 15a.

The curves shown in Figures 3 and 6 should now be closely compared. It is important to note that whereas curve 8a (Figure 3) first rises steeply and then becomes almost horizontal as acceleration increases in a positive direction, in Figure 6 curve 15a first drops steeply and then becomes almost horizontal as the acceleration increases in a positive direction. The difference in characteristics of these two curves is utilized in the improved accelerometer of this invention.

Figure 7:
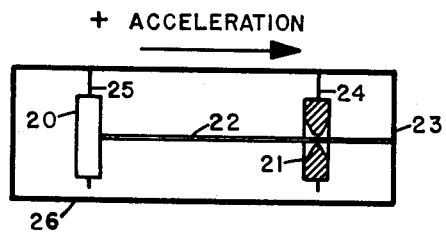
Figure 7 is a schematic illustration of an accelerometer in which both the tension and length of vibrating wire are varied to produce an accumulative effect in response to changes of acceleration.

Turning attention now to Figure 7, there is schematically illustrated an accelerometer in which is provided an inertial disc 20 and an inertial disc 21. A taut wire 22 extends between disc 20 and the fixed right end 23 of the accelerometer. The disc 21 is closely fitted about the wire at an intermediate point, as described with reference to Figure 4. Both discs may be supported by leaf springs 24 and 25 which are secured to casing 26 of the accelerometer.

The placement of the discs relative to one another should be carefully examined. It will be noted that they are relatively remote from one another and so positioned that when the casing of the accelerometer is subjected to a positive acceleration, as indicated in Figure 7, both discs independently act to increase the natural frequency of the wire disposed between the discs. To illustrate, when the casing is subjected to a positive acceleration, disc 20 tends to lag the casing and increases the tension of the wire 22. This results in an increase in frequency as described with reference to Figure 2. Simultaneously, disc 21 tends to lag the casing and shortens the effective length of vibrating wire, resulting in an increase of natural frequency, as illustrated by Figure 5. In other words, the independent effects of both discs in raising the natural frequency of the wire are cumulative when the parts are arranged as shown in Figure 7.

Figure 8:
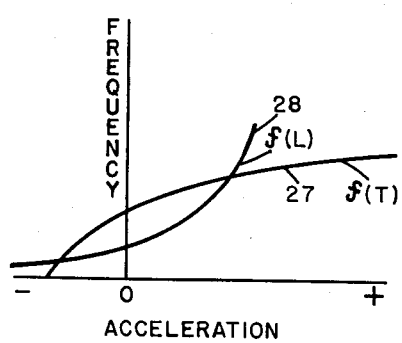
Figure 8 is a plot of frequency vs. acceleration of the independent effects which are cumulative in the accelerometer of Figure 7.

The independent effects are represented by separate curves in Figure 8. It will be noted that the curve 27, which is a function of tension ($f(T)$), and the curve 28, which is a function of length ($f(L)$), are opposite in nature, curve 27 at first rising steeply and then leveling out, while curve 28 at first rises gradually and then quite steeply.

Figure 9:
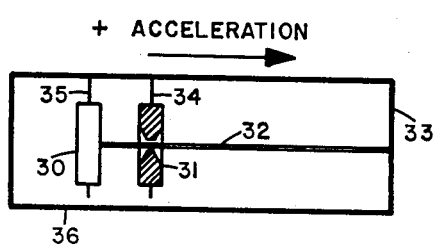
Figure 9 is a schematic representation of an accelerometer in which the variation in tension and length of a vibrating wire in response to acceleration oppose each other.

In Figure 9 is shown another accelerometer in which inertial discs 30 and 31 vary the natural frequency of a taut wire 32. As before, the wire is stretched with an initial tension between movable disc 30 and fixed end wall 33 of the accelerometer. Springs 34 and 35 yieldably support the discs from casing 36. Contrary to the accelerometer of Figure 7, the discs of Figure 9 are arranged so that the independent inertial effects of the masses or discs oppose each other. Thus, assuming a positive acceleration as indicated, the tendency of the mass 30 to lag increases the tension of the wire 32, raising its frequency as described with reference to Figure 2. The mass 31, however, in lagging the movement of the casing 36, tends to increase the effective length of wire 32 and to reduce its natural frequency, as described with reference to Figure 5.

Figure 10:
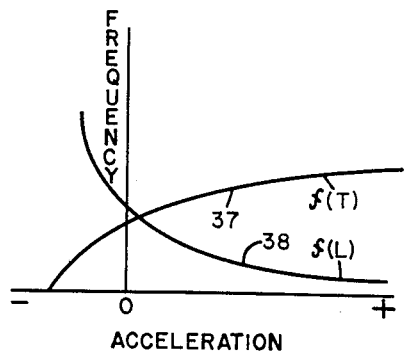
Figure 10 is a plot of frequency vs. acceleration for the independent effects which are in opposition to each other in the accelerometer of Figure 9.

For convenience, the independent effects of the masses are illustrated in Figure 10. Curve 37 will be recognized as a function of tension while curve 38 illustrates the effect of length on the frequency of the wire. The arrangement of these curves, however, is to be contrasted with those of Figure 8. The opposing nature of the independent effects now becomes apparent. Whereas curve 37 illustrates a rather rapid and then gradually less rapid increase of frequency as the acceleration becomes more positive, curve 38 illustrates, at first, a rapid drop in frequency and then a gradually less severe drop in frequency, as the acceleration becomes more positive. In other words, the tendency to increase frequency through change of tension is more than offset by the tendency to decrease frequency through increase of length of the vibrating portion of the wire.

Thus, in partial summary, it will be noted that two independent effects are provided for changing the frequency of the wire for acceleration purposes. Of course, either effect could be used separately in making an accelerometer. However, when used separately, each accelerometer would have a limited practical operating range. As illustrated by Figures 1 and 4, neither accelerometer would be particularly sensitive at large values of acceleration, although both would be quite sensitive at small values of acceleration and for measuring negative accelerations.

Figure 11:
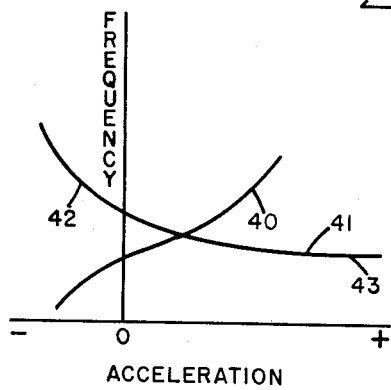
Figure 11 is a composite plot of frequency vs. acceleration for accelerometers of the type shown in Figures 7 and 9.

Attention should now be directed to Figure 11 which shows composite curve 40. An accelerometer having the combined characteristics of this curve resulting from the accumulative effects of an arrangement such as shown in Figure 7, will be remarkably sensitive over its entire operating range. Although the over-all range of operation may necessarily have to be limited somewhat because of the extreme degree of sensitivity, accurate measurements within its accepted range will be excellent.

Composite curve 41 illustrates the benefits of combining the independent effects in opposing relationship as illustrated in Figure 9. Here the dominant effect of curve 38 at negative accelerations makes the accelerometer quite effective in the region of the curve shown at 42. As the acceleration becomes more positive, change of frequency of the wire becomes more gradual and the sensitivity of the instrument decreases as illustrated by the portion of the curve at 43. This is highly significant. By combining elements as illustrated in Figure 9, it is possible to make a wide range accelerometer which is very sensitive in measuring low values of acceleration and less sensitive at higher values of acceleration. Stated otherwise, a single accelerometer of this type may have an indicating scale which is quite extended for accurate measurement of low values of acceleration and relatively condensed for measuring a large range of positive accelerations.

Extension of the range of operation can be effected by an expedient illustrated with reference to Figure 12. The details of the accelerometer therein illustrated will first be considered.

The accelerometer comprises a rigid casing 50 having fixed end walls 51 and 52. A taut wire 53 is stretched between end wall 51 and inertial disc 54. Intermediate the length of the wire is another inertial disc 55 which closely surrounds the wire, but does not bear on it, as was described earlier. Both inertial discs are resiliently supported by a plurality of leaf springs 56 and 57, respectively, which extend to and are fixedly attached to the casings 50.

In view of what has already been stated it will be understood that the length of wire disposed between discs 54 and 55 is used for acceleration measuring purposes. This length of wire may be excited by any suitable means. For purposes of illustration only, an electro-magnetic coil 58 is shown closely adjacent the wire. The details of the exciting circuit have not been disclosed since they comprise no part of this invention. It is sufficient to understand that a sinusoidal voltage may be applied to the coil. Its frequency may be adjusted to the fundamental frequency of the taut wire. At this time, resonance will occur and the vibrating wire can be caused to modulate the output of a pickup 59 which is also placed adjacent to the wire. Any suitable pickup, for example an electrostatic pickup, may be used. A maximum reading in the output circuit of the pickup will indicate that the exciter has attained the natural frequency of the wire. From a knowledge of the frequency and the characteristics of the instrument, the acceleration to which the instrument is subjected can be determined.

The electrical circuits associated with the instrument can be arranged in a variety of ways besides those described. To illustrate, the coil 58 could be energized through a random noise generator and the wire stimulated into vibration at its natural frequency. The output of the pickup could be beat against the output of a local oscillator and the beat frequency used as an accurate determination of the natural frequency of the wire, and hence the acceleration then prevailing. Depending upon the types of transducers used, it may be desirable to shield them and to provide a switching circuit to operate them alternately.

The composition of the wire, its diameter, its length, its initial tension, and the stiffness of springs 56 and 57, and the mass of discs 54 and 55 all are design factors which can be utilized in designing an instrument having characteristics of a particular type. For electro-magnetic excitation, it is desirable to make the wire out of a ferromagnetic material. As an alternative, the wire may be made of a diamagnetic material which has a ferromagnetic coating. It would also be possible to provide masses of magnetic material lumped on the wire adjacent the electro-magnetic exciter and transducers. If mechanical excitation is used, the magnetic characteristics of the wire are immaterial.

It is desirable to operate the accelerometer in a constant temperature environment since temperature effects may change various parameters which have bearing on the frequency of the wire. Naturally materials used in the accelerometer should have as small a coefficient of thermal expansion as is reasonably possible.

Figure 12:
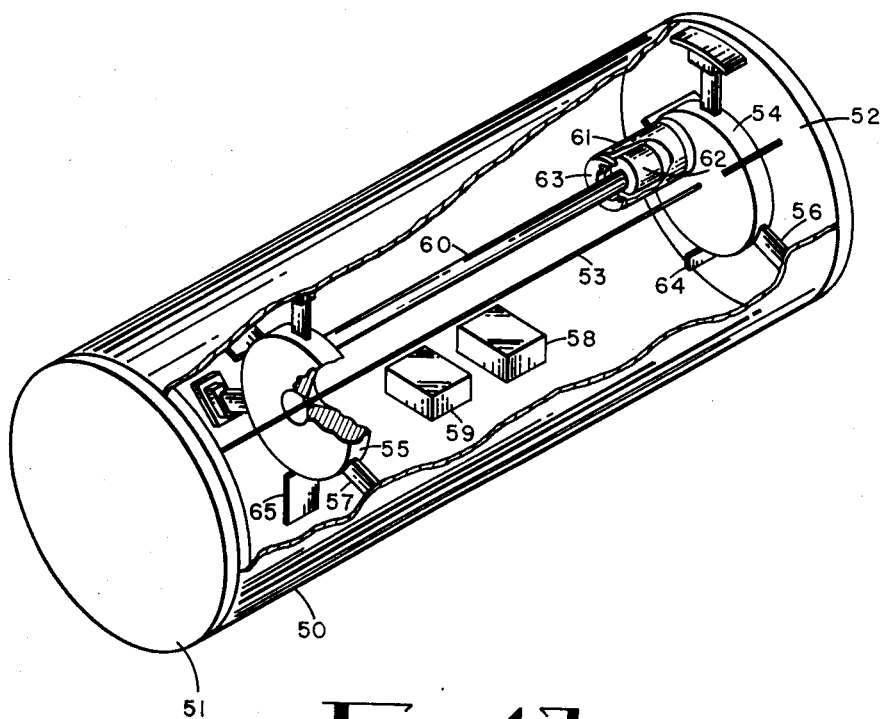
Figure 12 is a perspective view of the preferred embodiment of the invention.

An important refinement of the accelerometer shown in Figure 12 may now be considered. It will be noted that a rod 60 is fixedly secured to disc 55 and extends within a cup 61 secured to the face of disc 54 to form a lost-motion connection. The end of the rod within the cup has an enlargement 62 which is designed to abut the face of disc 54 or flange 63 as relative movement between discs 54 and 55 occurs. With this arrangement, springs 56 can be made very soft relative to springs 57. As a result, even at low values of acceleration, the disc 54 will execute relatively large movements, significantly varying the tension of the wire and producing sensitivity of the accelerometer at low values of acceleration. Since the disc 54 executes greater movement than disc 55, enlargement 62 is soon brought into bearing relationship against either disc 54 or flange 63. After this threshold of acceleration has been attained, the discs move in unison and the only effect determining natural frequency of the wire thereafter is that resulting from change of tension due to the combined masses under the influence of acceleration in deflecting their combined supporting springs.

One obvious advantage of this arrangement is that springs 56 can be made so soft that, in the absence of the lost motion connection, destruction of the instrument through failure of springs 56 would occur even at moderate values of acceleration. By virtue of the lost motion connection, however, inertia loading can be transferred from springs 56 to the combined springs 56 and 57. Since springs 57 are relatively stiff, the sensitivity of the instrument is reduced after the threshold of acceleration has been attained.

The type of springs used to resiliently support the discs is not critical and is a matter of design choice.

Guides 64 and 65 may be provided to confine discs 54 and 55 to axial movements parallel to wire 53. Because of the guides, accelerations normal to the wire will have no effect.

Obviously, a wide variety of accelerometers can be made by selectively combining the various design parameters. The softer springs 56 are made, the more sensitive will be the accelerometer at low values of acceleration. The greater the free movement of enlargement 62 within cup 61, the greater will be the range of accelerations during which the change of tension function is dominant. The ultimate operating range of the accelerometer is primarily a function of spring constants and the maximum deflection that can be tolerated without damage to structure.

From the foregoing description, it will be apparent that the masses or discs can be arranged for either accumulative or opposing action with or without an associated lost-motion connection. Composite accelerometers utilizing lost-motion connections can be made to operate over a wide range of accelerations, for example $10^{-4}g$ to $10^4 g$.

Having described a preferred embodiment of my invention, I claim:

1. A wire type accelerometer comprising a casing, an inertial mass, resilient means for supporting said inertial mass within said casing, a wire stretched between said mass and a relatively fixed point and adapted to vibrate, the length of said wire being varied by movement of said inertial mass, a second inertial mass, resilient means for supporting said second mass within said casing closely adjacent said wire for producing a node on said wire, and a lost motion connection between said masses arranged to permit limited independent movement of each mass below a threshold of acceleration and establishing conjoint movement of said masses above the threshold of acceleration.

2. A wire type accelerometer comprising a casing, an inertial mass resiliently supported within said casing, a taut wire stretched between said mass and a point on said casing and adapted to vibrate, the length of said wire being varied by movement of said inertial mass, a second inertial mass resiliently supported within said casing in close clearance relationship with said wire for producing a node on said wire, and a lost-motion connection between said masses.

3. Apparatus as defined in claim 2 in which said masses are remote from each other.

4. Apparatus as defined in claim 2 in which said masses are adjacent one another.

5. A wire type accelerometer comprising a casing, an inertial mass movably supported within said casing, a wire stretched between said mass and a point on said casing remote therefrom and adapted to vibrate, the length of said wire being varied by movement of said inertial mass, and a second inertial mass movably supported by said casing and positioned closely adjacent said wire for producing a node on said wire, the combined movements of said masses under the influence of acceleration varying the natural frequency of said wire as a function of acceleration.

6. Apparatus as defined in claim 5 and, in addition, a lost-motion connection between said first and second-mentioned inertial masses.

7. A wire type accelerometer comprising a casing, an inertial mass spring-supported within said casing, a taut wire stretched between said inertial mass and a fixed point of said casing and adapted to vibrate, the length of said wire being varied by movement of said inertial mass, and a second inertial mass spring-supported within said casing in close clearance relationship with said wire for limiting the amplitude of vibration of said wire adjacent said second mass.

8. Apparatus as defined in claim 7 in which said masses are remote from each other.

9. Apparatus as defined in claim 7 in which said masses are disposed adjacent one another.

10. A wire type accelerometer comprising a casing, a taut wire stretched between fixed points of said casing and adapted to vibrate, an inertial mass surrounding said wire in close clearance relationship therewith for limiting the amplitude of vibration of said wire adjacent said mass, and means for resiliently supporting said mass for movement relative to said wire.

11. A wire type accelerometer comprising a taut wire adapted to vibrate, an inertial mass closely adjacent said wire for limiting the amplitude of said wire adjacent said mass, and means for supporting said mass for movement relative to said wire as a function of acceleration.

12. An accelerometer comprising a vibrating element, means associated with said element for changing a parameter of said vibrating element for increasing its natural frequency in response to an increase of acceleration, and a second means associated with said vibrating element for changing a parameter of said vibrating element for increasing its natural frequency of vibration simultaneously with and independently of said first mentioned means in response to an increase of acceleration at a rate different from that of said first-mentioned means.

13. An accelerometer comprising a vibrating element and first and second means associated with said element for changing a parameter of said vibrating element for increasing its natural frequency of vibration in response to increase of acceleration affecting the accelerometer, said first and second means acting simultaneously and independently on said vibrating element.

14. An accelerometer comprising a vibrating element, means spaced from said element for changing a parameter of said vibrating element for decreasing its natural frequency of vibration in response to increase of acceleration, and a second means operatively connected to said vibrating element for changing a parameter of said vibrating element for increasing its natural frequency of vibration in response to increase of acceleration said aforementioned means acting simultaneously and independently on said vibrating element.

15. An accelerometer comprising a vibrating element means operatively connected to said element for changing a parameter of said vibrating element for changing its natural frequency of vibration in response to acceleration, and a second means spaced from said vibrating element for changing a parameter of said vibrating element for changing its natural frequency of vibration in response to acceleration at a rate different from that of said first-mentioned means said aforementioned means acting simultaneously and independently on said vibrating element.

16. Apparatus as defined in claim 15 and means for rendering said first and second-named means effective for varying the natural frequency of said vibrating element in unison after a certain threshold of acceleration has been attained.

References Cited in the file of this patent

UNITED STATES PATENTS

| | | |
|---|---|---|
| 2,272,984 | Ritzmann | Feb. 10, 1942 |
| 2,650,991 | Ketchledge | Sept. 1, 1953 |
| 2,725,492 | Allan | Nov. 29, 1955 |
| 2,728,868 | Peterson | Dec. 27, 1955 |
| 2,835,774 | Statham | May 20, 1958 |

FOREIGN PATENTS

| | | |
|---|---|---|
| 729,894 | Germany | Dec. 19, 1942 |
| 789,611 | Great Britain | Jan. 22, 1958 |